United States Patent [19]
Hawthorne

[11] Patent Number: 5,832,087
[45] Date of Patent: Nov. 3, 1998

[54] APPARATUS FOR GENERATING ENCRYPTION/DECRYPTION LOOK-UP TABLES USING A SESSION KEY

[75] Inventor: William McMullan Hawthorne, Norwich, England

[73] Assignee: Chantilley Corporation Limited, Buckinghamshire, England

[21] Appl. No.: 718,484

[22] PCT Filed: Mar. 23, 1995

[86] PCT No.: PCT/GB95/00660

§ 371 Date: Sep. 20, 1996

§ 102(e) Date: Sep. 20, 1996

[87] PCT Pub. No.: WO95/26087

PCT Pub. Date: Sep. 28, 1995

[30] Foreign Application Priority Data

Mar. 23, 1994 [GB] United Kingdom .................. 9405766

[51] Int. Cl.$^6$ ................................ H04L 9/08; H04L 9/00
[52] U.S. Cl. .................................. 380/21; 380/9; 380/44; 380/46; 380/49; 380/50
[58] Field of Search .................... 380/9, 10, 20, 380/21, 28, 44, 45, 46, 47, 48, 49, 50, 54, 59

[56] References Cited

U.S. PATENT DOCUMENTS 4,776,011 10/1988 Busby ........................................ 380/37
5,063,596 11/1991 Dyke ........................................ 380/49
5,204,901 4/1993 Hershey et al. ......................... 380/21

FOREIGN PATENT DOCUMENTS

WO 91/03113 3/1991 WIPO .............................. H04L 9/06

OTHER PUBLICATIONS

*Establishment of User Keys in a Multi–User Network*, C.H. Meyer and W.L. Tuchman, IBM Technical Disclosure Bulletin, vol. 22, No. 2, Jul. 1979, pp. 629–631.

Primary Examiner—Bernarr E. Gregory
Attorney, Agent, or Firm—David P. Gordon; David S. Jacobson; Thomas A. Gallagher

[57] ABSTRACT

An encryption/decryption apparatus enables encrypted communication between two stations each incorporating such an apparatus. The apparatus is arranged to generate a set of look-up tables in accordance with a session key and temporarily store these tables in memory, and to convert each successive element, such as a character, of a message to a code through use of the look-up tables. The session key can be changed as often as desired but the fresh set of look-up are created quickly each time; then the conversion process for each element of the message is carried out quickly yet maintaining a high level of security.

16 Claims, 3 Drawing Sheets

FIG. 4

Transposition (T) table:
0 1 2 3 4 5 6 7 8 9 10 11 12 13 14 15 16 17 18 19 20 21 22 23 24 25
7 17 19 23 14 12 21 24 13 20 11 6 18 4 16 25 1 9 15 0 22 10 3 5 2 8

Pseudo-random (PR) table:
18 13 15 7 7 20 0 19 21 18 1 10 22 20 9 25 22 1 24 9 ........

| Message: | M | E | X | I | C | A | N | B | A | N | K | S | A | T | R | I | S | K |
|---|---|---|---|---|---|---|---|---|---|---|---|---|---|---|---|---|---|---|
| Transposition: | 18 | 14 | 5 | 13 | 19 | 7 | 4 | 17 | 7 | 4 | 11 | 15 | 7 | 0 | 9 | 13 | 15 | 11 |
| PR: | 18 | 13 | 15 | 7 | 7 | 20 | 0 | 19 | 21 | 18 | 1 | 10 | 22 | 20 | 9 | 25 | 22 | 1 |
| Addition of PR: | 10 | 1 | 20 | 20 | 0 | 1 | 4 | 10 | 2 | 22 | 12 | 25 | 3 | 20 | 18 | 12 | 11 | 12 |
| Crypt: | K | B | U | U | A | B | E | K | C | W | M | Z | D | U | S | M | L | M |

FIG. 5

Displacement table D1:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|----|----|----|----|----|----|----|----|----|----|----|----|----|----|----|----|
| 16| 17| 20| 10| 7 | 15| 17| 5 | 11| 1 | 21 | 6  | 17 | 2  | 10 | 11 | 18 | 23 | 7  | 2  | 15 | 7  | 8  | 4  | 9  | 7  |

Displacement table D2:

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|----|----|----|----|----|----|----|----|----|----|----|----|----|----|----|----|
| 18| 21| 1 | 8 | 10| 13| 14| 24| 8 | 15| 0  | 17 | 21 | 22 | 25 | 2  | 14 | 15 | 3  | 7  | 3  | 4  | 23 | 15 | 3  | 16 |

| Message: | M | E | X | I | C | A | N | B | A | N | K | S | A | T | R | I | S | K |
|---|---|---|---|---|---|---|---|---|---|---|---|---|---|---|---|---|---|---|
| A=0......Z=25: | 12 | 4 | 23 | 8 | 2 | 0 | 13 | 1 | 0 | 13 | 10 | 18 | 0 | 19 | 17 | 8 | 18 | 10 |
| Output from D1: | 17 | 15 | 7 | 6 | 17 | 15 | 2 | 11 | 11 | 8 | 15 | 10 | 17 | 17 | 15 | 4 | 11 | 17 |
| Add output: | 3 | 19 | 4 | 14 | 19 | 15 | 15 | 12 | 11 | 21 | 25 | 2 | 17 | 10 | 6 | 12 | 3 | 1 |
| Output from D2: | 8 | 7 | 10 | 25 | 7 | 2 | 2 | 21 | 17 | 4 | 16 | 1 | 15 | 0 | 14 | 21 | 8 | 21 |
| Add output: | 11 | 0 | 14 | 13 | 0 | 17 | 17 | 7 | 2 | 25 | 15 | 3 | 6 | 10 | 20 | 7 | 11 | 22 |
| Crypt A=0...Z=25: | L | A | O | N | A | R | R | H | C | Z | P | D | G | K | U | H | L | W |

APPARATUS FOR GENERATING ENCRYPTION/DECRYPTION LOOK-UP TABLES USING A SESSION KEY

BACKGROUND OF THE INVENTION

The present invention relates to arrangements for the automatic encryption and decryption of electronically transmitted messages, particularly in the fields of telephone, facsimile or computer data transmission for example.

The present invention is concerned with providing arrangements for encrypting and decrypting messages at high speeds yet maintaining a high level of security.

SUMMARY OF THE INVENTION

In accordance with this invention, there is provided an encryption/decryption apparatus to enable encrypted communication between two stations each incorporating such an apparatus, the apparatus being arranged to generate a set of look-up tables in accordance with a session key and temporarily store said tables in memory, and to convert each successive element of a message to a code through use of said look-up tables.

It will be appreciated that a fresh session key is used for each transmission or session: a fresh set of look-up tables is therefore generated at the start of each transmission or session. The session key can in fact be changed (and a new set of look-up tables consequently generated) at intervals during the course of each transmission.

The set of look-up tables can be generated quickly, and the procedure to encode each element (e.g. character, bit or block) of the message can be carried out quickly yet maintaining a high level of security.

Each element of the message may be converted to its code by addressing one of the look-up tables, the output of which is used to address another of the look-up tables, and so on. The conversion procedure may involve at least two look-up tables being addressed simultaneously and their outputs being combined (e.g. added together). At least one of the tables may comprise a pseudo random sequence, the terms (or entries) of which are read consecutively, the pointer returning to the first term when the last term of the table has been read: the pointer may start at any predetermined position of the sequence.

It will be appreciated that for encryption of a message by the sender and correct decryption by the recipient, both sender and recipient apparatus must use the same session key for each transmission (or part thereof), so that the two stations can generate corresponding look-up tables. Our International patent application PCT/GB94/02004 describes one arrangement in which a sender apparatus generates a session key and the same session key is recreated at the recipient.

Embodiments of this invention will now be described by way of examples only and with reference to the accompanying Drawings.

BRIEF DESCRIPTION OF THE DRAWINGS

FIG. 4 is a worked example of an encryption procedure performed by an apparatus in accordance with the invention; and FIG. 5 is a worked example of another encryption procedure performed by an apparatus in accordance with the invention.

DETAILED DESCRIPTION OF THE PREFERRED EMBODIMENT

Figure 1:
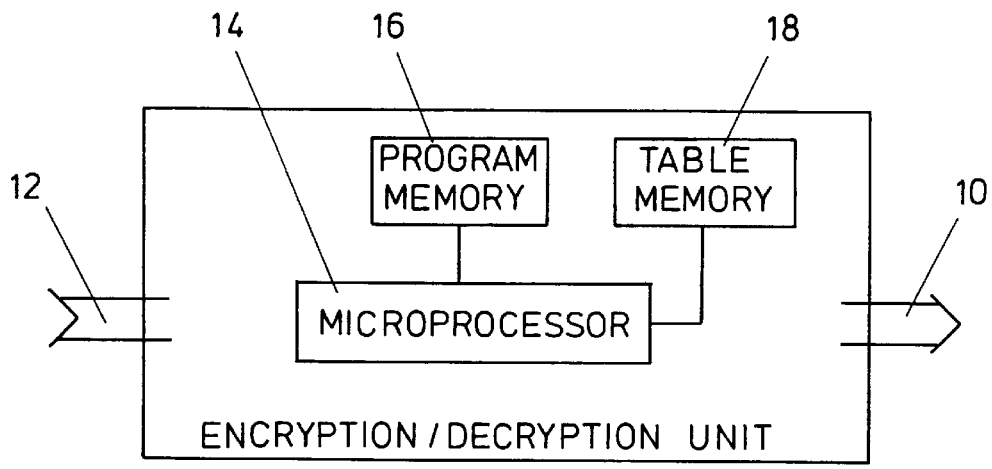
FIG. 1 is a schematic block diagram of an encrypting/decrypting unit used at each sender/recipient station.

Referring to FIG. 1, there is shown an encryption/decryption unit 20 in accordance with this invention, in simplified diagrammatic form. Typically the unit 20 will form part of a communications machine (e.g. facsimile machine). The unit 20 includes an external port 10 for transmitting encrypted data to, and receiving encrypted data from, a corresponding unit at another station, with which it is desired to communicate. The unit also includes a port 12 for the flow of data to and from local host equipment. The unit 20 further includes a microprocessor 14 having a program memory 16 and a memory 18 for temporarily holding look-up tables which are used for encrypting data to be transmitted via the external port 10, and for decrypting data received via the external port 10.

For each fresh transmission (or session) between the unit and a corresponding unit at another station, a new set of look-up tables is generated and programmed into the memory 18 of the two units. Each new set of look-up tables is generated in accordance with a new, random session key: the program memory 16 of the two communicating units stores the same algorithm for generating (and subsequently using) the look-up tables, so that both units generate the same look-up tables from the same session key. One unit acts as sender and generates the random session key and sends this in encrypted form to the other (or recipient) unit: the session key may be generated at the sender, and recreated at the recipient, in the manner described in our International patent application PCT/GB94/02004. As previously noted, the session key can be changed at intervals within each transmission (or session). Once each new set of look-up tables has been created, from the new session key, at the sender and recipient units, the encrypted transmission of data can proceed: thus, a plain message received, at port 12 of the sender unit is encrypted, under control of the microprocessor 14 and using the look-up tables, and then transmitted via the data port 10; the recipient unit correspondingly receives the encrypted message and decrypts it.

The look-up tables are preferably of the types T, IT, D, ID or PR, as will now be described. Each table may have more than 4000 entries, but the essential character of the different types of table can be exemplified as follows using 10 entries only.

A transposition table (Type T) is a table in which numbers or characters are in a different order from the original, for example as follows:

| Original order | 0 1 2 3 4 5 6 7 8 9 |
|---|---|
| T Table | 4 3 5 7 1 0 8 6 9 2 |

The inverse transposition table (Type ID) is the inverse of the above in that it restores the original order when it is applied to the T table:

|        |             |
|--------|-------------|
|        | 0 1 2 3 4 5 6 7 8 9 |
| IT Table | 5 4 9 1 0 2 7 3 6 8 |

The displacement table (Type D) is derived from the transposition table and gives the positive displacement of each entry in the transposition table from its original position:

|                |                     |
|----------------|---------------------|
| Original order | 0 1 2 3 4 5 6 7 8 9 |
| T Table        | 4 3 5 7 1 0 8 6 9 2 |
| D Table        | 4 2 3 4 7 5 2 9 1 3 |

The inverse displacement table (Type IT) is the displacement table corresponding to the inverse transposition table.

A pseudo-random table (Type PR) is composed of pseudo-randomly generated numbers in a specified domain:

|          |                     |
|----------|---------------------|
| Domain   | 0 1 2 3 4 5 6 7 8 9 |
| PR Table | 1 4 4 8 7 6 3 2 8 5 |

In a PR table, numbers within the domain may be omitted and others duplicated because the choice of entry at any part of the table does not depend on the choice of previous entries.

Figure 2:
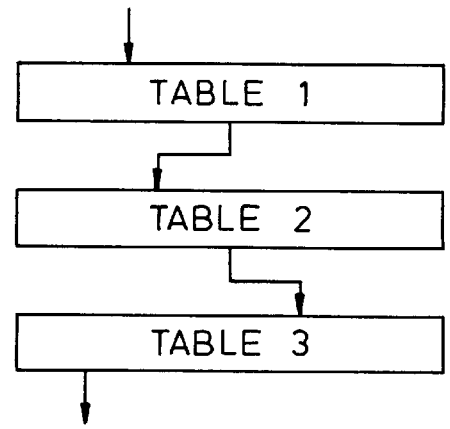
FIG. 2 is a schematic flow diagram to explain the operation of one form of high speed cypher in accordance with the invention.

In the example shown in FIG. 2, each successive character of the message to be encrypted is referred to a first look-up table which may be of any type previously described. The output of the first look-up table addresses the second look-up table and the output of the second addresses the third and so on. In this way, a succession of elements (e.g. character, bit or block) in the input message is converted to a corresponding succession of encrypted outputs from the final look-up table, for transmission from the sender to the recipient.

Figure 3:
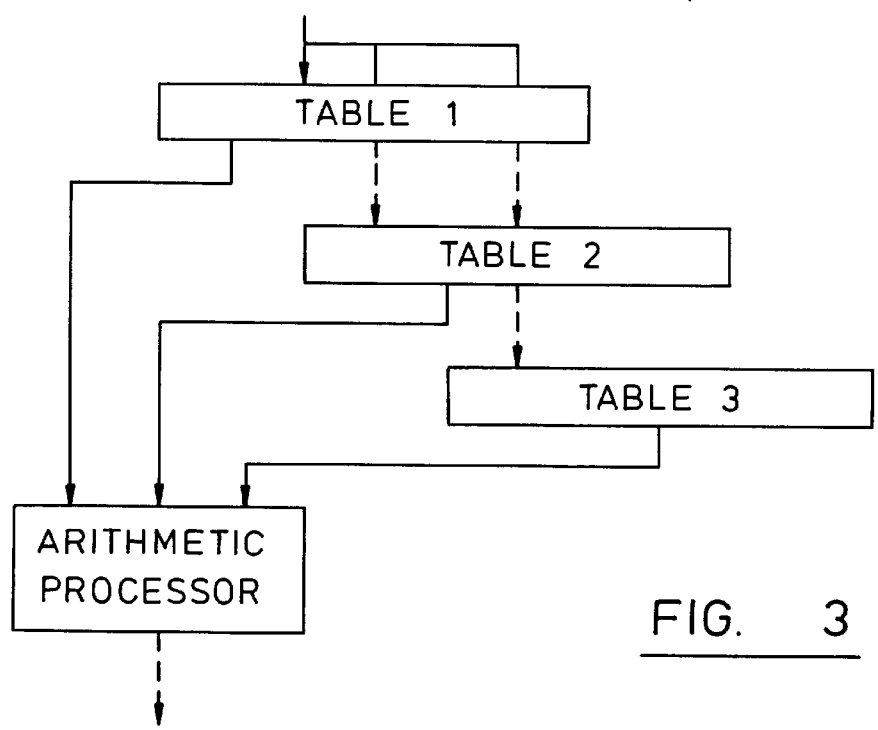
FIG. 3 is a similar flow diagram to explain the operation of another form of high speed cypher in accordance with the invention.

The look-up tables of the set may be used in different order on different transmissions as a means of increasing the complexity of the cypher: alternatively, each element in the main message may be converted by addressing two or more look-up tables simultaneously and combining (e.g. adding together) their outputs, as shown in FIG. 3.

In the art of computer programming, reading a look-up table requires fewer steps than the multiplication and division steps usually carried out in element-by-element encryption, so that, once a set of tables has been generated, an algorithm largely based on reading tables permits rapid encryption. The decryption at the receiver is carried out in a similar manner, i.e. by each encrypted element of the received message being converted, by a corresponding arrangement of look-up tables, to the original element itself.

FIG. 4 shows an example using a single T table and a single PR table. In this example, A=0, B=1, ... Z=25, and all additions are modulo 26. After each character of the message is transposed by the transposition table, the next successive term of the PR table is added to provide the encryption of the original character.

FIG. 5 shows an example using two D tables. However, the first table (D1) makes one rotary shift (i.e. the lower or output line shifts one step to the left) per character of the message: similarly, the second table (D2) makes one rotary shift per 26 characters of the message. Thus, for each character, the input and output of the first table (D1) are added together; this result is used to address the second table (D2) and is added together with the corresponding output of the second table (D2).

The session key may typically comprise a numerical decimal-digit number, for example up to 12 digits long. Many ways are known for generating a PR table from such a session key. Any convenient way may be used to generate a transposition table from such a session key, and one example will be explained with reference to the following table.

|   | 0 | 1 | 2 | 3 | 4 | 5 | 6 | 7 | 8 | 9 |
|---|---|---|---|---|---|---|---|---|---|---|
| 4 | 4 | 1 | 2 | 3 | 0 | 5 | 6 | 7 | 8 | 9 |
| 1 | 4 | 1 | 2 | 3 | 0 | 5 | 6 | 7 | 8 | 9 |
| 3 | 4 | 1 | 3 | 2 | 0 | 5 | 6 | 7 | 8 | 9 |
| 6 | 4 | 1 | 3 | 6 | 0 | 5 | 2 | 7 | 8 | 9 |
| 0 | 0 | 1 | 3 | 6 | 4 | 5 | 2 | 7 | 8 | 9 |
| 1 | 0 | 5 | 3 | 6 | 4 | 1 | 2 | 7 | 8 | 9 |
| 4 | 0 | 5 | 3 | 6 | 2 | 1 | 4 | 7 | 8 | 9 |
| 0 | 7 | 5 | 3 | 6 | 2 | 1 | 4 | 0 | 8 | 9 |
| 6 | 7 | 5 | 3 | 6 | 2 | 1 | 8 | 0 | 4 | 9 |
| 0 | 9 | 5 | 3 | 6 | 2 | 1 | 8 | 0 | 4 | 7 |

The session key is set out in the vertical column at the extreme left hand side of the table. The successive terms of the session key (starting at the top of the column) are used in successive steps to change the original order (0, 1 ... 9) given in the top row, to the T table given in the bottom row. In the first step, the term "4" of the session key dictates that, in the initial row, the term in column 4 is exchanged with the term in column 0 (all other terms in the second row remain as in the first row). In the second step, the term "1" of the session key dictates that the term in column 1 is exchanged with the term in column 1 (with no net change in this case). In the third step, the term "3" of the session key dictates that the term in column 3 is exchanged with the term in column 2. The procedure progresses in this manner until, in the final step, the term "0" of the session key dictates that the term in column 0 is exchanged with the term in the final column. Having thus produced the T table, a D table can be generated, each of its terms being the displacement of the T table term from its corresponding original term.

I claim:

1. An encryption/decryption apparatus for incorporation into a communications station to provide for encrypted sending and receiving of messages between that station and a second station which also incorporates such an apparatus, the message including a plurality of successive elements, the apparatus comprising:

a) means for generating a random session key, said means for generating a random key being operable when the communication station is acting as a sender of a message;

b) means for generating a cryptographic image of said random session key;

c) means for transmitting said cryptographic image of said random session key to the second station;

d) program memory means for storing a table-generating algorithm;

e) means for generating a set of tables from said session key in accordance with said table-generating algorithm, at least one of said tables comprising a stream of successive terms;

f) table memory means for storing said set of tables;

g) an input for receiving a message to be encrypted;

h) encrypting means for using said tables to convert each successive element of the message to a cryptographic image -thereof, the terms of said one of said tables being read consecutively; and i) means for transmitting said cryptographic image of the message to the second station.

2. An apparatus according to claim 1, wherein:

said means for generating a random session key is arranged to generate a new said random session key at intervals during the course of transmission of each said message.

3. An apparatus according to claim 1, wherein:

said encrypting means is arranged to convert each element of the message to said cryptographic image of the message by reading at least two of said tables simultaneously to determine respective output terms and combining said output terms.

4. An apparatus according to claim 3, wherein:

said set of tables comprises a plurality of pseudo-random streams.

5. An apparatus according to claim 1, wherein:

said encrypting means is arranged to convert each element of the message to said cryptographic image of the message by reading a first of said tables to determine output terms and using said output terms to read another of said tables.

6. An apparatus according to claim 1, wherein:

said set of tables includes at least one transposition table consisting of a succession of terms transposed from an original order to an order different than said original order.

7. An apparatus according to claim 6, wherein:

said set of tables includes at least one displacement table consisting of a succession of values representing the displacement of each term of one of said at least one transposition table from its original position.

8. An apparatus according to claim 1, wherein:

said encrypting means uses each table of said set only once in converting each element of the message to its respective cryptographic image.

9. A method of encryption/decryption for a communications station to provide for the encrypted sending and receiving of messages between that station and a second station which also performs such a method, the message including a plurality of successive elements, the method comprising:

a) generating a random session key, when the communication station is acting as a sender of a message;

b) generating a cryptographic image of the random session key;

c) transmitting the cryptographic image of the random session key to the second station;

d) storing a table-generating algorithm in an algorithm storage means in the communications station;

e) generating a set of tables from the session key in accordance with said table-generating algorithm, at least one of the tables comprising a stream of successive terms;

f) storing said set of tables in a table memory means in the communications station;

g) receiving a message to be encrypted;

h) encrypting each successive element of the message to a cryptographic image thereof by using the tables, the terms of one of the tables being read consecutively; and i) transmitting the cryptographic image of the message to the second station.

10. A method according to claim 9, wherein:

said generating a random session key generates a new random session key at intervals during said transmitting the cryptographic image of said random session key.

11. A method according to claim 9, wherein:

said encrypting includes converting each element of the message to a cryptographic image by reading at least two of the set of tables simultaneously, and combining the respective output terms of the respective tables.

12. A method according to claim 11, wherein:

said set of tables comprises a plurality of pseudo-random streams, said reading includes reading the respective output terms consecutively.

13. A method according to claim 9, wherein: said encrypting includes converting each element of the message to its cryptographic image by reading a first of said tables to determine respective output terms and using said output terms to read another of said tables.

14. A method according to claim 9, wherein:

said set of tables includes at least one transposition table comprising a succession of terms transposed from[ ]an original order to an order different than the original order.

15. A method according to claim 14, wherein:

said set of tables includes at least one displacement table comprising a succession of values representing the displacement of each term of the transposition table from its original position.

16. A method according to claim 9, wherein:

said encrypting converts each element of the message to its respective cryptographic image by using each table of the set of tables only once.

\* \* \* \* \*